United States Patent [19]

Nuns et al.

[11] Patent Number: 4,987,828
[45] Date of Patent: Jan. 29, 1991

[54] INDUCTIVE HEATING APPARATUS FOR COOKING THIN DISHES SUCH AS OMELETS, QUICHES OR THE LIKE

[75] Inventors: Jacques Nuns; Alain Girault, both of Moret S/Loing, France

[73] Assignee: Electricite De France - Service National, Paris, France

[21] Appl. No.: 277,818

[22] Filed: Nov. 30, 1988

[30] Foreign Application Priority Data

Dec. 2, 1987 [FR] France ................................ 87 16655

[51] Int. Cl.⁵ .................................................. A23L 3/00
[52] U.S. Cl. .................................... 99/443 C; 99/423; 99/DIG. 14; 198/711; 198/803.14; 219/104.93; 219/10.71
[58] Field of Search .............. 99/386, 373, 423, 443 C, 99/443 R, DIG. 14; 219/10.493, 10.69, 10.71; 198/463.1, 473.1, 711, 803.14

[56] References Cited

U.S. PATENT DOCUMENTS

| 400,978 | 4/1889 | Watts | 219/10.493 |
| 2,138,247 | 11/1938 | Tatosian | 99/373 |
| 2,485,659 | 10/1949 | Robertson | 99/DIG. 14 |
| 3,097,588 | 7/1963 | De Jersey | 99/353 |
| 3,440,384 | 4/1969 | Schroeder | 219/10.493 |
| 3,712,357 | 1/1973 | Corbett et al. | 198/711 |
| 3,979,572 | 9/1976 | Ito et al. | 219/10.493 |
| 4,241,250 | 12/1980 | Steigerwald | 219/10.493 |
| 4,614,852 | 9/1986 | Matsushita et al. | 219/10.493 |
| 4,621,177 | 11/1986 | Pulkowski et al. | 219/10.71 |
| 4,687,985 | 8/1987 | Chitre et al. | 99/DIG. 14 |
| 4,792,652 | 12/1988 | Seguy et al. | 219/10.493 |

FOREIGN PATENT DOCUMENTS

| 1286243 | 4/1969 | Fed. Rep. of Germany | 219/10.69 |
| 2315819 | 1/1977 | France | |
| 2481042 | 10/1981 | France | |
| 224193 | 11/1924 | United Kingdom | 198/711 |
| 758898 | 10/1956 | United Kingdom | |

Primary Examiner—Harvey C. Hornsby
Assistant Examiner—Mark Spisich
Attorney, Agent, or Firm—Sughrue, Mion, Zinn, Macpeak & Seas

[57] ABSTRACT

The apparatus comprises an endless conveyor band (2) of insulating material on which are mounted at even distances apart receptacles (7) composed of a metal adapted to receive separate portions of a dish to be cooked and inductors (10a, 10b) disposed below the upper reach (6) of the conveyor. The inductors have a diameter roughly equal to one-half of the diameter of the receptacles and are disposed in at least two rows in the direction of movement of the conveyor (2) symmetrically relative to the axis of movement of the receptacles. The inner edges of the inductors (10a, 10b) are located beyond a vertical plane containing the axis of movement of the receptacles (7) so as to insure a homogeneous heating of the receptacles.

6 Claims, 2 Drawing Sheets

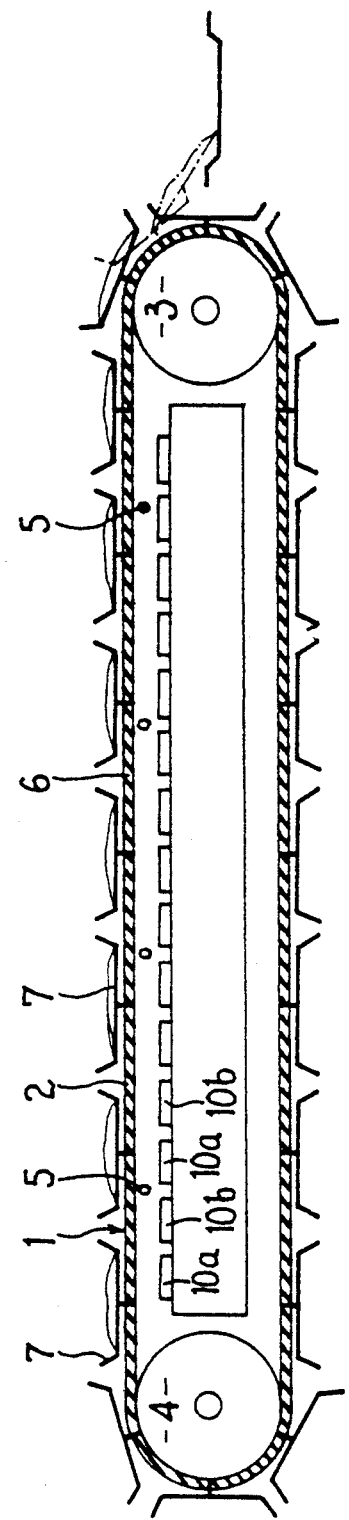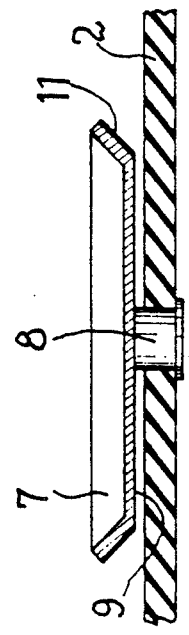

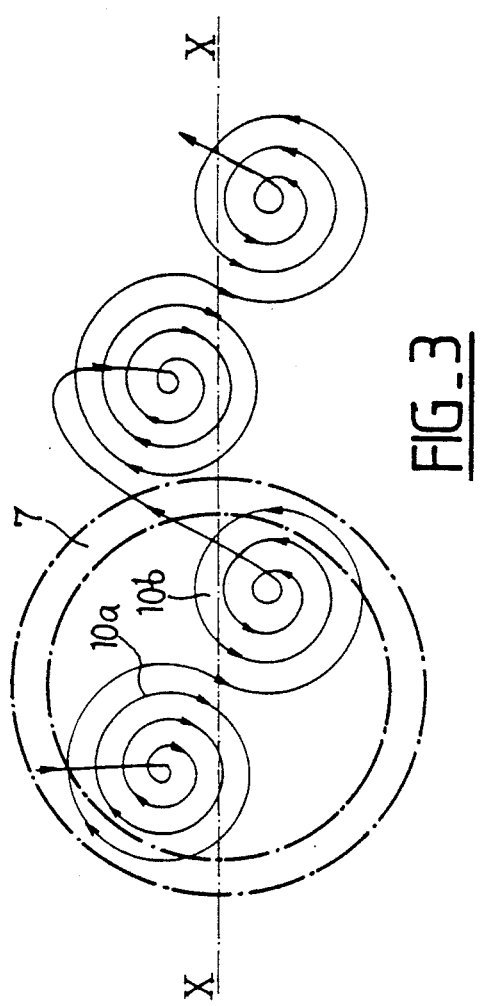
FIG_3
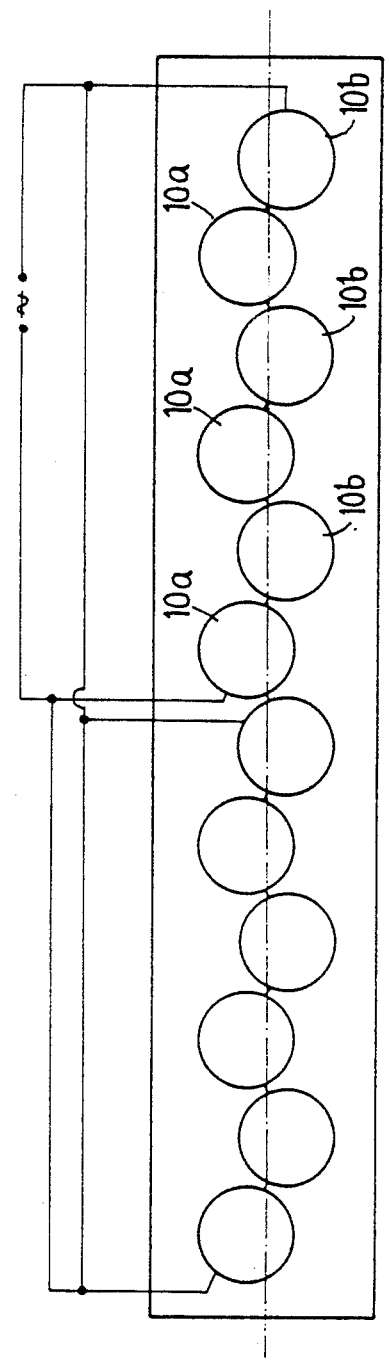
FIG_4

INDUCTIVE HEATING APPARATUS FOR COOKING THIN DISHES SUCH AS OMELETS, QUICHES OR THE LIKE

BACKGROUND OF THE INVENTION

The present invention relates to apparatus for cooking cooked dishes and more particularly relates to apparatus for cooking thin dishes such as omelets, quiches, pizzas or the like intended for restauration on a large scale, for example school cantines, restaurants of firms or the like.

In restaurants having a large output of the aforementioned type, it is necessary to satisfy a large number of people who usually take an imposed menu so that a given dish must be prepared at an accelerated rate in accordance with peak periods of the restaurant.

For preparing dishes such as omelets, quiches or the like, the cooking installations even when provided with a large number of "burners", do not permit insuring a sufficient output in that, when all the burners are occupied, it is necessary to wait until all the dishes have been cooked before taking them off the burners and replacing them with a batch of following dishes.

There is consequently a need for restaurants having a large output of a cooking apparatus which is capable of offering to the clients fully-cooked and hot dishes in an uninterrupted manner.

SUMMARY OF THE INVENTION

An object of the invention is to provide a cooking apparatus which satisfies the aforementioned requirements.

The invention therefore provides an apparatus for cooking thin dishes such as omelets, quiches or the like, comprising an endless conveyor on which are placed at even distances apart metal receptacles adapted to receive separate portions of said dish, and means for heating said receptacles, wherein said heating means are constituted by inductors disposed below the upper reach of said conveyor, said inductors having a diameter roughly equal to one half of the diameter of the receptacles and being disposed in at least two rows in the direction of movement of the conveyor symmetrically relative to the axis of movement of the receptacles, the inner edges of the inductors being located beyond a vertical plane containing said axis of movement of the receptacles so as to insure a homogeneous heating of said receptacles.

A better understanding of the invention will be had from the following description which is given solely by way of example with reference to the accompanying drawings, in which:

BRIEF DESCRIPTION OF THE DRAWINGS

FIG. 1 is a diagrammatic elevational view of a cooking apparatus according to the invention;

FIG. 2 is a sectional view to an enlarged scale of a detail of the cooking apparatus of FIG. 1;

FIG. 3 is a partial plan view to an enlarged scale of the relative arrangement of the inductors relative to the receptacles of the cooking apparatus of FIG. 1, and FIG. 4 is a partial diagrammatic view of the electrical connections of the inductors of the cooking apparatus according to the invention.

DETAILED DESCRIPTION OF A PREFERRED EMBODIMENT

The cooking apparatus shown in FIG. 1 is adapted, as mentioned hereinbefore, to the cooking of thin dishes such as omelets, quiches, pizzas or the like.

It mainly comprises an endless conveyor 1 including a band 2 of an insulating material capable of withstanding temperatures which may reach about 200° C., mounted between a driving roll 3 driven by an electric motor (not shown) and a driven roll 4, support rollers 5 being interposed between the two rolls 3 and 4 for supporting the upper reach 6 of the conveyor band 2.

Disposed at even distances apart on the conveyor band 2 are receptacles 7 adapted to receive individual portions of the dishes to be cooked, these receptacles being in the presently-described embodiment advantageously formed by pans coated internally with an anti-adherent material and each provided, as shown in FIG. 2, with a central pillar 8 which is fixed to the bottom of the pans and extends through the material of the conveyor band 2 for the purpose of securing the pan 7 to said band 2, for example by a setting or forming-over operation or the like, so that a gap 9 is left between the bottom of the pan 2 and the conveyor band so as to avoid an excessive heating of the material of the latter.

Mounted below the upper reach 6 of the conveyor band between the driving and driven rolls 3 and 4, are electric inductors 10a, 10b disposed in the presently-described embodiment in two staggered rows parallel to the direction of movement of the conveyor band 2.

As shown in FIG. 3, the inductors 10a and 10b of the two aforementioned rows are spiral inductors having a generally circular shape whose diameters are roughly equal to one half of the diameter of the bottom of the pans 7 which are conveyed above the inductors on the conveyor band 2.

The inductors 10a and 10b of the two rows are staggered and are disposed symmetrically relative to the axis X-X of movement of the pans 7 (FIGS. 1 and 3), one of these pans being shown in dot-dash line in FIG. 3.

The inner edges of the inductors 10a and 10b project beyond the vertical plane containing the axis X-X of movement of the pans (whereby adjacent inductors in the two rows are staggered relative to each other with respect to this vertical plane) so as to ensure a substantially homogeneous heating of said pans 7 in the course of their movement by the conveyor band 2.

The heating achieved by the apparatus may be controlled by adapting the distance between the inductors 10a 10b of the two rows in accordance with the diameter of the receptacles to be heated.

In order to be more effective, bearing in mind the inductors 10a, 10b are close to one another, they are so connected that the currents circulating in two neighboring (adjacent) inductors do not oppose each other, i.e. the supply current circulates in opposite directions in two neighboring inductors.

The direction of the current in the neighboring inductors is shown by the arrows in FIG. 3 in which it can be seen that the arrows of the neighboring portions of the coils of two neighboring inductors have the same direction.

FIG. 4 shows a manner of electrically connecting the inductors of the apparatus according to the invention.

In this embodiment, the inductors represented by the circles are connected in series in a group of six inductors, the successive groups of six inductors 10a, 10b in series being connected in parallel to an AC power supply.

With reference again to FIG. 2, it can be seen that each of the pans 7 is covered on the outer surface of its edge with a layer 11 of brazing of a material which is a good conductor of electricity adapted to insure that the pan 7 does not undergo an excessive heating when its front edge, relative to the direction of movement of the conveyor band 2, reaches an inductor 10a, since the currents induced by the inductor are then closed onto a region of the pan of small area, or when the rear edge of said pan 7 leaves an inductor 10b, which results in an excessive localized heating for the same reasons.

This coating which is a good conductor may be for example constituted by a silver brazing covering the outer surface of the edge of the pan.

The conveyor band 2 is advantageously shifted at a rate of 10 m per min and the inductors are disposed in a length of about 25 m, which permits the cooking of an omelet during about 2 min 30 sec in the course of its travel along the conveyor axis.

The rate of movement of the conveyor band may of course be adapted to the required cooking time of the dish to be prepared.

The raw material constituting the dish is placed on the pan at a charging station disposed at an input end of the conveyor, the cooking of the dish occurs in the pan 7 during the travel of the latter between the input end and the output end of the conveyor and, when the pan reaches the vicinity of the driving roll 3 its tilting about this roll causes at the same time the transfer of its cooked contents into a plate or the like suitably disposed for this purpose.

As the pans are internally coated with an anti-adherent material, they are returned to the charging station located in the vicinity of the driven roll 4 without necessity to clean the pans, at least during a utilization of a few hours corresponding to the period for preparing the dishes in the course of a day of restauration.

The fact that the inductors 10a, 10b are disposed in a staggered fashion on each side of the diameter of the circular trace of each pan, parallel to the direction of movement of the conveyor band, and that the areas of these staggered inductors intersect this diameter so as to obtain an overlapping heat power zone in the center of the circular trace, permits obtaining a homogeneous distribution of the heating of the pans 7 by the inductors 10a, 10b.

The arrangement just described therefore permits obtaining the uninterrupted cooking of thin dishes such as omelets, quiches or the like with a rate adapted to the requirements of a restaurant intended to serve many clients who have a limited time for taking their meals.

What is claimed is:

1. An apparatus for cooking thin dishes such as omelets, quiches or the like, comprising an endless conveyor having an upper reach movable in a given direction and a lower reach, substantially round receptacles adapted to receive separate portions of said dish and mounted at even distances apart on said upper reach of the conveyor, and inductive heating means for heating said receptacles, said heating means comprising a plurality of spiral electric inductors having a generally circular shape disposed below said upper each of said conveyor, each of said inductors having a diameter approximately equal to one-half of the diameter of the receptacles and being disposed in two staggered rows extending, in said given direction of movement of said upper reach of the conveyor, symmetrically relative to an axis of movement of the receptacles, wherein said axis of movement is horizontal, and wherein adjacent inductors in said two rows extend in respectively opposite directions horizontally through a central vertical plane of said conveyor whereby said adjacent inductors are staggered and overlap with respect to said vertical plane, and wherein said adjacent inductors are interconnected such that electric current flows through them in respectively opposite directions, so as to ensure a homogeneous heating of said receptacles.

2. An apparatus according to claim 1, wherein said conveyor comprises a continuous band and said receptacles are constituted by pans having bottoms and pillars fixing the pans to the conveyor, each pillar being connected to the bottom of a pan and extending through said conveyor band, a gap being provided between the bottom of each pan and the conveyor band.

3. An apparatus according to claim 1, wherein each of the receptacles has an edge on which is provided an outer coating which is a good conductor of electricity.

4. An apparatus according to claim 3, wherein said coating which is a good conductor of electricity is a silver brazing.

5. An apparatus according to claim 1, wherein the inductors are connected in series in groups, and the groups of inductors connected in series are connected in parallel to an AC power supply.

6. An apparatus according to claim 2, wherein the conveyor band is made from a flexible material which withstands high temperatures on the order of 200° C.

* * * * *

UNITED STATES PATENT AND TRADEMARK OFFICE
CERTIFICATE OF CORRECTION

PATENT NO. : 4,987,828

DATED : January 29, 1991

INVENTOR(S) : Jacques NUNS et al

It is certified that error appears in the above-identified patent and that said Letters Patent is hereby corrected as shown below:

On the title page:
[30] Foreign Application Priority Data

Delete "Dec. 2, 1987", and insert --Dec. 1, 1987--.

Signed and Sealed this

Twenty-eighth Day of July, 1992

*Attest:*

DOUGLAS B. COMER

*Attesting Officer*   Acting Commissioner of Patents and Trademarks